H. S. Miller.
Forming Bats.

No 134 Reissued Apr. 24, 1849.

UNITED STATES PATENT OFFICE.

HEZEKIAH S. MILLER, OF CINCINNATI, OHIO.

IMPROVEMENT IN MACHINERY FOR MAKING FELT FABRICS, &c.

Specification forming part of Letters Patent No. 1,094, dated March 5, 1839; Reissue No. 134, dated April 24, 1849.

*To all whom it may concern:*

Be it known that I, HEZEKIAH S. MILLER, formerly of the county of Philadelphia, in the State of Pennsylvania, and now of Cincinnati, Hamilton county, Ohio, have invented new and useful improvements in the manufacture of felt from fur, wadding from cotton, or continuous webs, laps, or sheets from animal or vegetable fibrous materials; and I do hereby declare the following to be a full, clear, and exact description of the same, reference being had to the annexed drawings, making part of this specification, in which—

Figure 1:
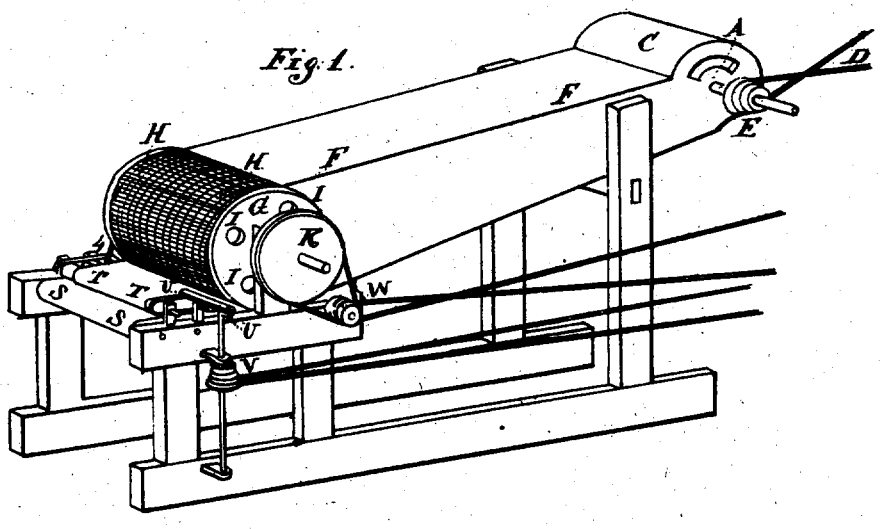
Figure 3:
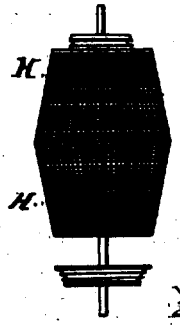
Figure 2:
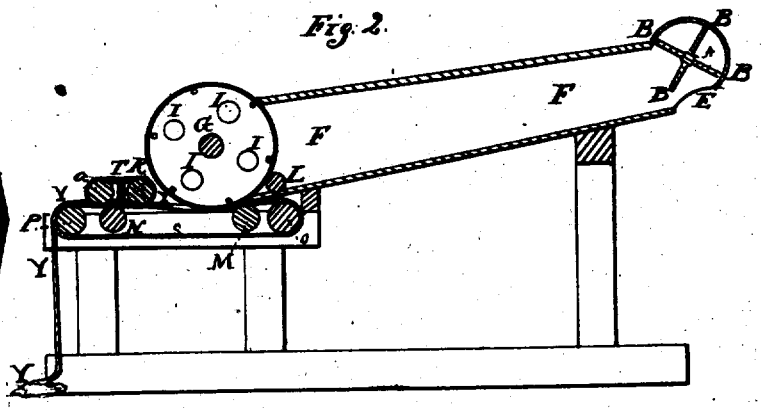

Figure 1 is a perspective view of the machine; Fig. 2, a vertical and longitudinal section of the same; and Fig. 3 represents a different form of gauze cylinder, such as I use in the process.

The nature of my invention consists in converting animal or vegetable fibrous material into continuous webs, laps, or sheets, while using the one or the other after they have been carded, picked, or blown so as to wind into hat-bodies, and attain advantageously with fur the same end which has been heretofore effected in relation to wool, and to manufacture wadding from cotton, or other web from other fibrous vegetable material. This is done by the following process, viz: A revolving fan or blower having four or more floats or wings, and of length to correspond with the breadth of a carding-machine picker or blowing-machine, receives the animal or vegetable fiber from the doffer of a carding-machine, or from a picker, or from a blowing-machine in the case of fur, (such as is known among hatters and used for cleansing the hair from fur,) and blows them through a passage, oblong box, or spout until they reach a cylinder of which the surface is composed of sieve-work, wire-gauze, millinet, or other similar open substance, so as to admit through it the air received with the fibers from the revolving fan aforesaid. This gauze cylinder is in constant motion, so that the fibers received from the fan through the said passage are made to pass through between the said gauze cylinder and a friction-roller, and are compressed between them into a web, film, or sheet of fur or wadding, &c. The web, lap, or wadding so formed then follows a small distance on the surface of the said gauze cylinder, until it reaches a revolving apron or endless sheet of leather or other suitable material, when it is again compressed between said apron and the gauze cylinder, the pressure being assisted by a second roller placed within the said apron or endless sheet. The web or sheet, if of fur, then continues to advance upon the surface of the said apron until it reaches another similar apron, placed over the first mentioned, and is there, between the two aprons, compressed a third time, the compression being assisted by the rollers placed within each apron. The web or sheet of fur is now perfected, so that it may be wound into hat-bodies upon a roller of the customary or proper form, in the same manner, well known to hatters, which has heretofore been practiced for winding a web or sheet of wool for the same purpose. If, however, the fibers under treatment are vegetable—for instance, of cotton—and the article to be produced is that commonly known as "cotton-wadding," the superincumbent apron is not used, as the object is to manufacture cotton-wadding of the least density consistent with sufficient tenacity due to the felting of the fibers to permit handling the article. The superincumbent apron can, however, be elevated sufficiently to retain its felting without its condensing-power, and used in this way it need not be set aside.

A, Fig. 1, and A, Fig. 2, represents the revolving fan or blower, which first receives the fibers from the doffer of the carding-machine, &c.

B B B B are the four floats or wings of the fan A.

C, Fig. 1, is the cover to the said fan, which cover may be of wood or other material, and the floats of the fans may be of wood, metal, or other suitable substance.

D, Fig. 1, is the band by which the fan A is driven.

E, Fig. 1, and E, Fig. 2, is the place where the doffer of the carding-machine fits underneath the fan of the wadding or web forming machine, which latter is my invention.

F F, Fig. 1, and F F, Fig. 2, is the oblong box, passage, or spout through which the fibers are driven by the fan A. It may be made of wood or other material, in breadth proportioned to the carding-machine or picker, &c., in thickness or vertical diameter about ten inches at the upper and twelve inches at the lower end, and in length about six feet, or of such other size and proportions as may be found expedient.

G, Fig. 1, and G, Fig. 2, is the cylinder of wire-gauze, &c., which constitutes an important portion of my improvement.

H H, Fig. 1, and H H, Fig. 3, is the sieve-work, wire-gauze, or other open-work of which the surface of the cylinder G is composed. The form of the cylinder in Fig. 1 is straight or of uniform diameter, while that in Fig. 3 is swelled in the middle, approaching that of a double cone. The form represented in Fig. 3 may be used, if desired, for the purpose of increasing the thickness of the central part of the web or lap when fur is being manipulated, so as to give more substance or thickness to the rims of the hats, two hat-bodies being made from one web, as is customary.

I I I, Fig. 1, and I I I I, Fig. 2, are boxes or holes through the ends of the gauze cylinder, made for facilitating the escape of the air which is received into the cylinder from the fan A.

K, Fig. 1, is the pulley by which the gauze cylinder G is driven, the band being also seen in the drawings.

L, Fig. 2, is the roller by which the fibers are first compressed into a web between it and the gauze cylinder G.

M, Fig. 2, is the roller which next aids in compressing the web between the gauze cylinder and principal apron, and N, Fig. 2, is the third compressing-roller, which aids to compress the web when fur is being operated on between the principal and lesser apron or revolving sheets. In the manufacture of cotton-wadding, however, the superincumbent apron is dispensed with or elevated so as only to felt, as condensation is obnoxious to good wadding.

O and P, Fig. 2, are the two rollers on which the principal apron revolves, and Q and R Fig. 2, are the rollers over which the smaller or secondary apron revolves.

S S, Fig. 1, is the principal apron, and T T, Fig. 1, is the secondary or upper apron. The edges of these aprons are also seen in section at S and T, Fig. 2. The secondary apron T T has a frame for its rollers Q R, so constructed that the frame of the rollers and the apron together are capable of a reciprocating lateral or side motion. This lateral reciprocating motion is communicated through the rod U U, Fig. 1, which rod is moved back and forth by a crank or eccentric connecting its outer end with the upper end of the shaft, which is moved by the pulley V, Fig. 1, as seen in the drawings. The contemplated advantage of this reciprocating lateral motion of the upper apron is the more fully to press and mat together the web or lap of fur.

W, Fig. 1, is the pulley which drives the roller O, Fig. 2, and puts the principal roller in motion, and X, Fig. 1, is the band coming from the pulley on the farther end of the cylinder G, and putting in motion the roller R, Fig. 2, so as to make the upper apron revolve.

Y Y Y Y, Fig. 2, is a lap or sheet of fur, the edge of which is seen in section proceeding from the gauze cylinder along the surface of the principal apron and descending to the floor. The manner of winding this sheet into hat-bodies on a double core or cylinder is the same which is used for making wool hats.

When cotton-wadding is the product of the operation of the machine, it is handled and prepared for the market in the usual way.

These operations are not illustrated in the drawings, because they are well known to those in the trades, and constitute no part of my improvements.

What I claim as my invention, and desire to secure by Letters Patent, is—

1. The combination of the fan, oblong box or spout, and cylinder, for the purpose and in the manner herein described.

2. The combination of the two aprons operating for the purposes and in the manner herein described, and also these in combination with the combined fan, spout, and cylinder, as herein described.

HEZEKIAH S. MILLER.

Attest:
THOS. G. CLINTON,
GEO. H. KNIGHT.